US012764344B2

(12) United States Patent
Norkin

(10) Patent No.: US 12,764,344 B2
(45) Date of Patent: Oct. 13, 2026

(54) TECHNIQUES FOR DEBANDING IN THE INTRA-PREDICTION STAGE OF A VIDEO CODING PIPELINE

(71) Applicant: NETFLIX, INC., Los Gatos, CA (US)

(72) Inventor: Andrey Norkin, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 18/904,032

(22) Filed: Oct. 1, 2024

(65) Prior Publication Data

US 2025/0113045 A1 Apr. 3, 2025

Related U.S. Application Data

(60) Provisional application No. 63/588,667, filed on Oct. 6, 2023, provisional application No. 63/587,406, filed on Oct. 2, 2023.

(51) Int. Cl.

| | |
|---|---|
| ***H04N 19/86*** | (2014.01) |
| ***H04N 19/117*** | (2014.01) |
| ***H04N 19/124*** | (2014.01) |
| ***H04N 19/132*** | (2014.01) |
| ***H04N 19/136*** | (2014.01) |

(Continued)

(52) U.S. Cl.

CPC ........... *H04N 19/86* (2014.11); *H04N 19/117* (2014.11); *H04N 19/124* (2014.11); *H04N 19/132* (2014.11); *H04N 19/136* (2014.11); *H04N 19/147* (2014.11); *H04N 19/159* (2014.11); *H04N 19/176* (2014.11);

(Continued)

(58) Field of Classification Search

CPC .... H04N 19/86; H04N 19/117; H04N 19/124; H04N 19/132; H04N 19/136; H04N 19/147; H04N 19/159; H04N 19/176; H04N 19/625; H04N 19/80; H04N 19/82; H04N 19/18; H04N 19/48

USPC .................................................... 375/240.13

See application file for complete search history.

(56) References Cited

U.S. PATENT DOCUMENTS

| | | | |
|---|---|---|---|
| 2003/0108099 | A1 | 6/2003 | Nagumo et al. |
| 2005/0053294 | A1 | 3/2005 | Mukerjee et al. |

(Continued)

FOREIGN PATENT DOCUMENTS

| | | | |
|---|---|---|---|
| EP | 0 509 576 | A2 | 10/1992 |
| JP | H08-181617 | A | 7/1996 |

(Continued)

OTHER PUBLICATIONS

International Search Report for Application No. PCT/US2024/049634 dated Jan. 14, 2025.

(Continued)

*Primary Examiner* — Tung T Vo

(74) *Attorney, Agent, or Firm* — Artegis Law Group, LLP

(57) ABSTRACT

In various embodiments, a technique for reducing banding artifacts in decoded video data includes receiving a first set of reference samples, determining that the first set of reference samples meets a first criterion, selecting a first filter corresponding to the first criterion, applying the first filter to the first set of reference samples to generate a first set of filtered samples, performing at least one intra-prediction decoding operation on the first set of filtered samples to generate a first set of predicted samples, and generating a first portion of reconstructed video data based on the first set of predicted samples.

20 Claims, 7 Drawing Sheets

(51) Int. Cl.

| | |
|---|---|
| ***H04N 19/147*** | (2014.01) |
| ***H04N 19/159*** | (2014.01) |
| ***H04N 19/176*** | (2014.01) |
| ***H04N 19/625*** | (2014.01) |
| ***H04N 19/80*** | (2014.01) |
| ***H04N 19/82*** | (2014.01) |

(52) U.S. Cl.
CPC .......... *H04N 19/625* (2014.11); *H04N 19/80* (2014.11); *H04N 19/82* (2014.11)

(56) References Cited

U.S. PATENT DOCUMENTS

| | | | | |
|---|---|---|---|---|
| 2005/0210182 | A1 | 9/2005 | MacInnis | |
| 2006/0126962 | A1 | 6/2006 | Sun | |
| 2007/0299897 | A1 | 12/2007 | Reznik | |
| 2008/0063085 | A1 | 3/2008 | Wu et al. | |
| 2009/0016442 | A1 | 1/2009 | Shankar et al. | |
| 2009/0022418 | A1 | 1/2009 | Shankar et al. | |
| 2012/0087411 | A1 | 4/2012 | Haskell | |
| 2013/0046803 | A1 | 2/2013 | Parmar et al. | |
| 2013/0077884 | A1* | 3/2013 | Ikai | H04N 19/86 382/233 |
| 2013/0101016 | A1 | 4/2013 | Chong et al. | |
| 2013/0113884 | A1* | 5/2013 | Leontaris | H04N 19/48 348/43 |
| 2014/0029846 | A1 | 1/2014 | Su et al. | |
| 2017/0034536 | A1 | 2/2017 | Filippov et al. | |
| 2021/0105506 | A1 | 4/2021 | Misra et al. | |
| 2022/0086472 | A1* | 3/2022 | Zhao | H04N 19/44 |
| 2022/0141459 | A1* | 5/2022 | Sarwer | H04N 19/132 375/240.02 |
| 2022/0150536 | A1* | 5/2022 | Du | H04N 19/593 |
| 2022/0279176 | A1* | 9/2022 | Sarwer | H04N 19/14 |
| 2022/0295054 | A1* | 9/2022 | Zhao | H04N 19/117 |
| 2022/0303584 | A1* | 9/2022 | Du | H04N 19/186 |
| 2022/0303585 | A1* | 9/2022 | Zhao | H04N 19/82 |
| 2022/0303586 | A1* | 9/2022 | Du | H04N 19/70 |
| 2023/0276072 | A1 | 8/2023 | Sato | |
| 2023/0300328 | A1 | 9/2023 | Hu et al. | |
| 2024/0283926 | A1* | 8/2024 | Zhao | H04N 19/117 |
| 2025/0168404 | A1 | 5/2025 | Koo et al. | |

FOREIGN PATENT DOCUMENTS

| | | | |
|---|---|---|---|
| WO | 2017/190288 | A1 | 11/2017 |
| WO | 2020/007747 | A1 | 1/2020 |
| WO | 2021/061748 | A1 | 4/2021 |
| WO | 2023/235730 | A1 | 12/2023 |

OTHER PUBLICATIONS

International Search Report for Application No. PCT/US2024/049633 dated Jan. 20, 2025.

International Search Report for Application No. PCT/US2024/049636 dated Jan. 23, 2025.

Chono et al., "In-Loop Noise Shaping Based on Pseudo Noise Injection And Wiener Filtering", Multimedia Signal Processing, DOI: 10.1109/MMSP.2011.6093804, Oct. 17, 2011, 6 pages.

Jin et al., "Depth Dithering Based on Texture Edge-Assisted Classification", Signal Processing: Image Communication, http://dx.doi.org/10.1016/j.image.2016.05.006, vol. 47, May 10, 2016, pp. 56-71.

Tu et al., "Adaptive Debanding Filter", arXiv:2009.10804, Sep. 22, 2020, pp. 1-5.

Yoo et al., "In-Loop Selective Processing for Contour Artefact Reduction in Video Coding", Electronic Letters, DOI: 10.1049/EL:20092285, vol. 45 No. 20, Sep. 29, 2009, 2 pages.

Han et al., "A Technical Overview of Avl", Proceedings Of The IEEE, DOI 10.1109/JPROC.2021.3058584, vol. 109, No. 9, Sep. 2021, pp. 1435-1462.

Sole et al., "A Debanding Filter for AVM", Alliance for Open Media Codec Working Group, Nov. 14, 2022, 13 pages.

Hoang et al., "Coding 8-bit Video using 10 Bits", Alliance for Open Media Codec Working Group, Nov. 30, 2023, 7 pages.

Norkin, Andrey, "Generalized deblocking filter for AVM", IEEE proceedings of Picture Coding Symposium, Dec. 2022, 5 pages.

Tan et al., "Contouring Artefact and Solution", Joint Collaborative Team on Video Coding, Oct. 10-19, 2012, 8 pages.

Non Final Office Action received for U.S. Appl. No. 18/904,036, dated Dec. 4, 2025, 16 pages.

Non Final Office Action received for U.S. Appl. No. 18/904,037, dated Oct. 23, 2025, 22 pages.

Final Office Action received for U.S. Appl. No. 18/904,037, dated Mar. 18, 2026, 18 pages.

Final Office Action received for U.S. Appl. No. 18/904,036, dated Mar. 27, 2026, 18 pages.

* cited by examiner

TECHNIQUES FOR DEBANDING IN THE INTRA-PREDICTION STAGE OF A VIDEO CODING PIPELINE

CROSS-REFERENCE TO RELATED APPLICATIONS

This application claims the benefit of U.S. Provisional Application titled "TECHNIQUES FOR DEBANDING IN VIDEO CODING," filed on Oct. 2, 2023, and having Ser. No. 63/587,406, and "TECHNIQUES FOR DEBANDING IN VIDEO CODING," filed on Oct. 6, 2023, and having Ser. No. 63/588,667. The subject matter of these related applications is hereby incorporated by reference.

BACKGROUND

Field of the Various Embodiments

Embodiments of the present disclosure relate generally to computer science and video processing and, more specifically, to techniques for debanding in the intra-prediction stage of a video coding pipeline.

Description of the Related Art

Video content from a media title is commonly encoded to reduce the size of the video content and to convert the content into a format that is more suitable for broadcast, transmission, or playback on various devices or platforms. For example, video content from a movie or television show could be encoded into multiple versions that can be streamed to different endpoint devices. Each version of the video content could be associated with a certain encoding format, bit rate, frame rate, resolution, level of quantization, or other encoding settings that are optimized for streaming or playback on a particular set of endpoint device hardware and/or under a given set of network conditions. During encoding of video content from a media title, each video frame is divided into multiple blocks of fixed or varying sizes, and the portion of video content within each block is encoded. During playback of the media title on an endpoint device, the encoded blocks can be decoded and used to reconstruct the video frame.

In some instances, the encoding and decoding process described above introduces "banding" artifacts into reconstructed video frames. Banding artifacts are visual disruptions and/or distortions in reconstructed video frames that are not present in the original video content. Banding artifacts visually appear as striped regions and can sometimes be found in areas of a reconstructed video frame where a smooth transition between colors would otherwise occur. For example, banding artifacts are sometimes visible in portions of reconstructed video frames that are meant to depict a clear sky. Rather than depicting a smooth transition across many similar shades of blue, when banding artifacts are present, portions of the reconstructed video frames would instead display several abrupt transitions between just a few different shades of blue. As a general matter, banding artifacts are visually unappealing and are usually distracting to most viewers.

Banding artifacts can occur in many different coding implementations. Banding artifacts sometimes occur when directional intra-prediction coding techniques are used to encode and decode video content at higher quantization settings. In particular, the higher quantization settings can cause blocks/stretches of similar pixels to appear in reference samples. When the reference samples are subsequently used to reconstruct a portion of the video frame, these blocks are then replicated along the prediction direction, introducing a continuous region or "band" of similarly valued pixels into the portion of the reconstructed video frame. For example, when the prediction direction is top-to-bottom and left-to-right, blocks of similar pixels can sometimes be replicated across a portion of the reconstructed video frame, forming a diagonal band that extends from an upper-left area of the portion of the reconstructed video frame towards a lower-right area of the portion of the reconstructed video frame.

One approach to reducing banding is to perform "debanding" post-processing operations on each reconstructed video frame after decoding has occurred. During debanding post-processing, each reconstructed video frame is analyzed by hardware and/or software on the endpoint device to detect whether the reconstructed video frame includes any banding artifacts. To the extent banding artifacts are detected within a given reconstructed video frame, that reconstructed video frame is modified to reduce the visual impact of the detected banding artifacts. One drawback of this approach is that debanding post-processing operations are typically computationally intensive. Another drawback is that different endpoint devices typically implement different debanding post-processing operations due to varying hardware and/or software configurations, which can lead to inconsistent reductions in banding and inconsistent levels of visual quality across different endpoint devices.

As the foregoing illustrates, what is needed in the art are more effective techniques for reducing banding artifacts in decoded video data.

SUMMARY

In various embodiments, a technique for reducing banding artifacts in decoded video data includes receiving a first set of reference samples, determining that the first set of reference samples meets a first criterion, selecting a first filter corresponding to the first criterion, applying the first filter to the first set of reference samples to generate a first set of filtered samples, performing at least one intra-prediction operation on the first set of filtered samples to generate a first set of predicted samples, and generating a first portion of decoded video data based on the first set of predicted samples.

At least one technical advantage of the disclosed techniques relative to the prior art is that the disclosed techniques enable the decoding pipeline to reduce the appearance of banding artifacts in reconstructed frames of video data, thereby resulting in greater overall visual quality and higher-quality viewing experiences when streaming media titles. Another technical advantage of the disclosed techniques is that filtering reference samples during intra-prediction does not require the addition of any post-processing operations to the decoding pipeline. Accordingly, the disclosed techniques can be implemented without introducing additional blocks to the video decoding and processing pipeline. Yet another technical advantage of the disclosed techniques is that the disclosed decoding pipeline can be deployed to different types of endpoint devices, which can lead to more consistent debanding performance and visual quality across different endpoint devices having different hardware and/or software configurations. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
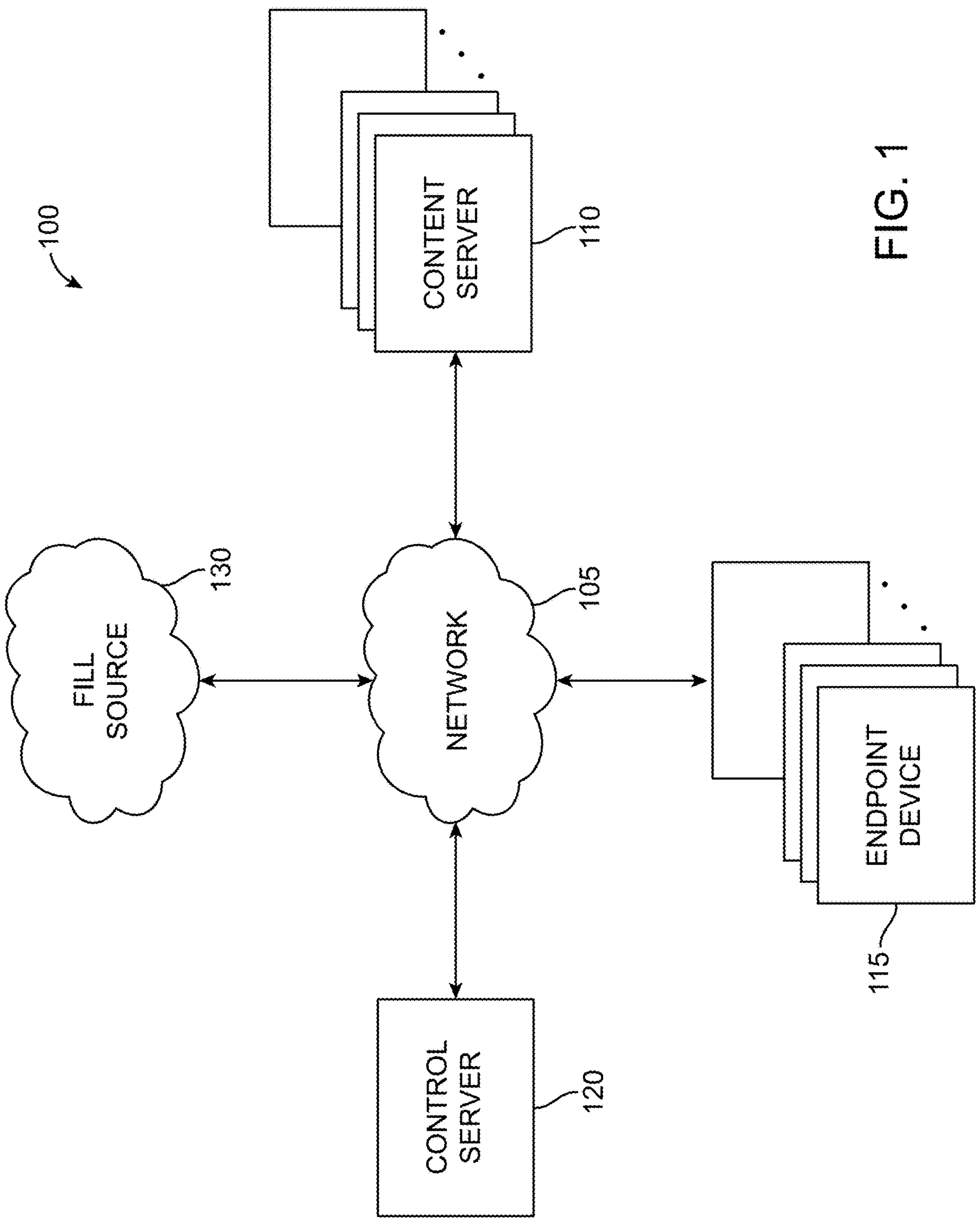
FIG. 1 illustrates a network infrastructure used to distribute content to content servers and endpoint devices, according to various embodiments.

In the following description, numerous specific details are set forth to provide a more thorough understanding of the embodiments of the present invention. However, it will be apparent to one of skill in the art that the embodiments of the present invention may be practiced without one or more of these specific details.

Banding artifacts are visual disruptions and/or distortions in reconstructed video frames that are not present in the original video content. Banding artifacts visually appear as striped regions and can sometimes be found in areas of a reconstructed video frame where a smooth transition between colors would otherwise occur. Banding artifacts can occur in many different coding implementations. Banding artifacts sometimes occur when directional intra-prediction coding techniques are used to encode and decode video content at higher quantization settings. In particular, the higher quantization settings can cause blocks/stretches of similar pixels to appear in reference samples. When the reference samples are subsequently used to reconstruct a portion of the video frame, these blocks are then replicated along the prediction direction, introducing a continuous region or "band" of similarly valued pixels into the portion of the reconstructed video frame. Many viewers find banding artifacts to be visually unappealing and distracting.

One approach to reducing banding is to perform "debanding" post-processing operations on each reconstructed video frame after decoding has occurred. During debanding post-processing, each reconstructed video frame is analyzed by hardware and/or software on the endpoint device to detect whether the reconstructed video frame includes any banding artifacts. To the extent banding artifacts are detected within a given reconstructed video frame, that reconstructed video frame is modified to reduce the visual impact of the detected banding artifacts. One drawback of this approach is that debanding post-processing operations are typically computationally intensive. Another drawback is that different endpoint devices typically implement different debanding post-processing operations due to varying hardware and/or software configurations, which can lead to inconsistent reductions in banding and inconsistent levels of visual quality across different endpoint devices.

To address the above issues, a decoding pipeline is configured to perform an intra-prediction decoding stage based on reference samples received via a compressed bitstream. The intra-prediction decoding stage includes a sample analyzer that is configured to analyze reference samples before intra-prediction occurs. The sample analyzer evaluates the reference samples using a set of criteria to identify a subset of reference samples that may contribute to the appearance of banding artifacts. The sample analyzer then selects a set of filters corresponding to the set of criteria and filters the subset of reference samples. The intra-prediction decoding stage then implements an intra-prediction operation using the filtered subset of reference samples and, in some cases, a remaining subset of non-filtered reference samples, to generate a set of predicted samples. This prediction stage would typically use reference samples in a higher bit depth than the bit depth of the resulting prediction sample values. The decoding pipeline can further be configured to perform a dithering operation with the set of predicted samples. During dithering, a random, pseudo-random or deterministically changing value is added to a predicted sample value prior to rounding, thereby mitigating situations where adjacent but differing sample values are rounded to the same value.

At least one technical advantage of the disclosed techniques relative to the prior art is that the disclosed techniques enable the decoding pipeline to reduce the appearance of banding artifacts in reconstructed frames of video data, thereby resulting in greater overall visual quality and higher-quality viewing experiences when streaming media titles. Another technical advantage of the disclosed techniques is that filtering reference samples during intra-prediction does not require the addition of any post-processing operations to the decoding pipeline. Accordingly, the disclosed techniques can be implemented without introducing complex debanding algorithms during decoding or playback of a media title. Yet another technical advantage of the disclosed techniques is that the disclosed decoding pipeline can be deployed to different types of endpoint devices, which can lead to more consistent debanding performance and visual quality across different endpoint devices having different hardware and/or software configurations. These technical advantages provide one or more technological improvements over prior art approaches.

System Overview

FIG. 1 illustrates a network infrastructure 100 used to distribute content to content servers 110 and endpoint devices 115, according to various embodiments. As shown, the network infrastructure 100 includes content servers 110, control server 120, and endpoint devices 115, each of which are connected via a communications network 105.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and hand-held video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with a fill source 130 and one or more other content servers 110 in order "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the fill source 130 may include an online storage service (e.g., Amazon® Simple Storage Service, Google® Cloud Storage, etc.) in which a catalog of files, including thousands or millions of files, is stored and accessed in order to fill the content servers 110. Although only a single fill source 130 is shown in FIG. 1, in various embodiments multiple fill sources 130 may be implemented to service requests for files. Further, as is well-understood, any cloud-based services can be included in the architecture of FIG. 1 beyond fill source 130 to the extent desired or necessary.

Figure 2:
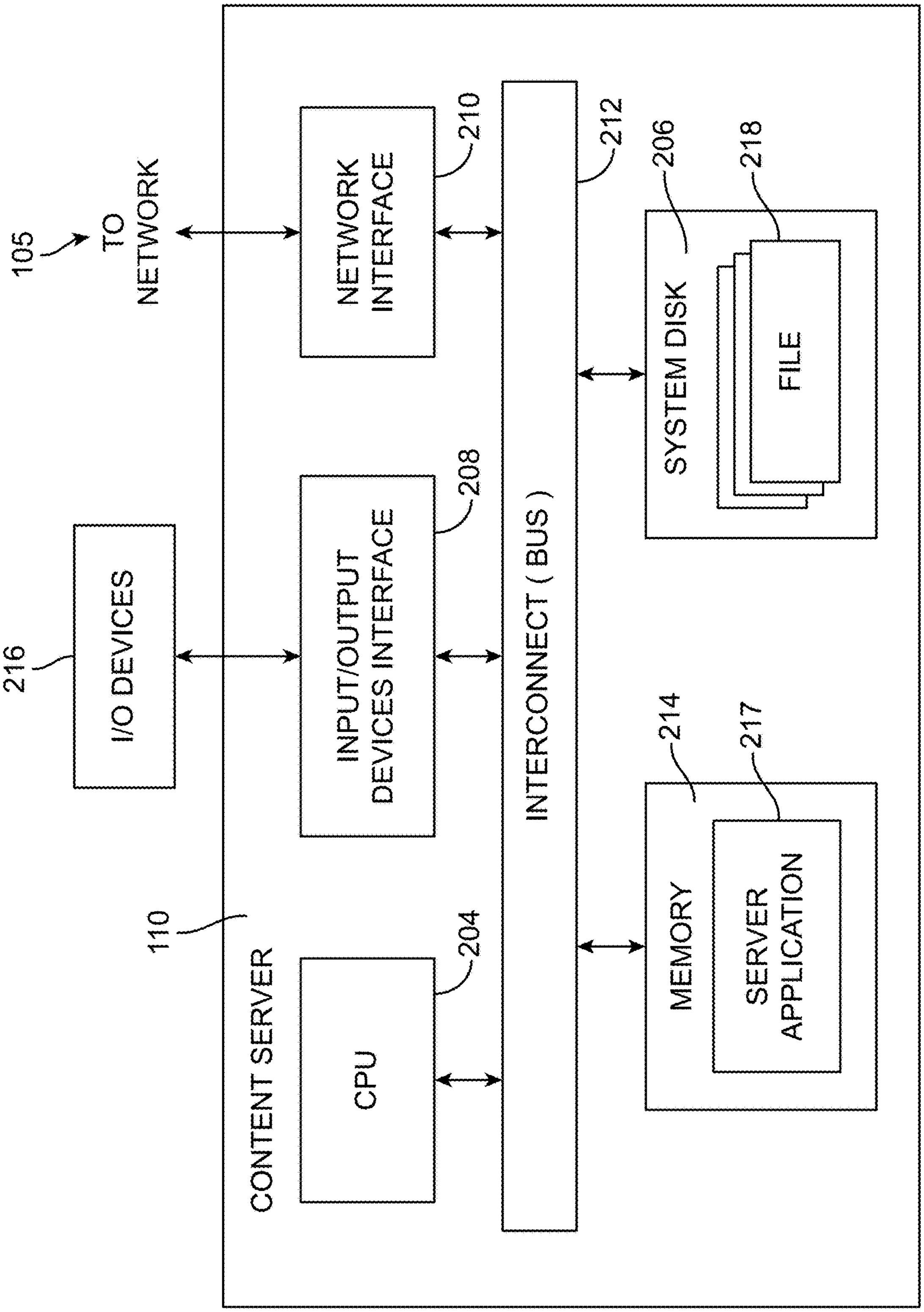
FIG. 2 is a block diagram of a content server that may be implemented in conjunction with the network infrastructure of FIG. 1, according to various embodiments.

FIG. 2 is a block diagram of a content server 110 that may be implemented in conjunction with the network infrastructure 100 of FIG. 1, according to various embodiments. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105.

Figure 3:
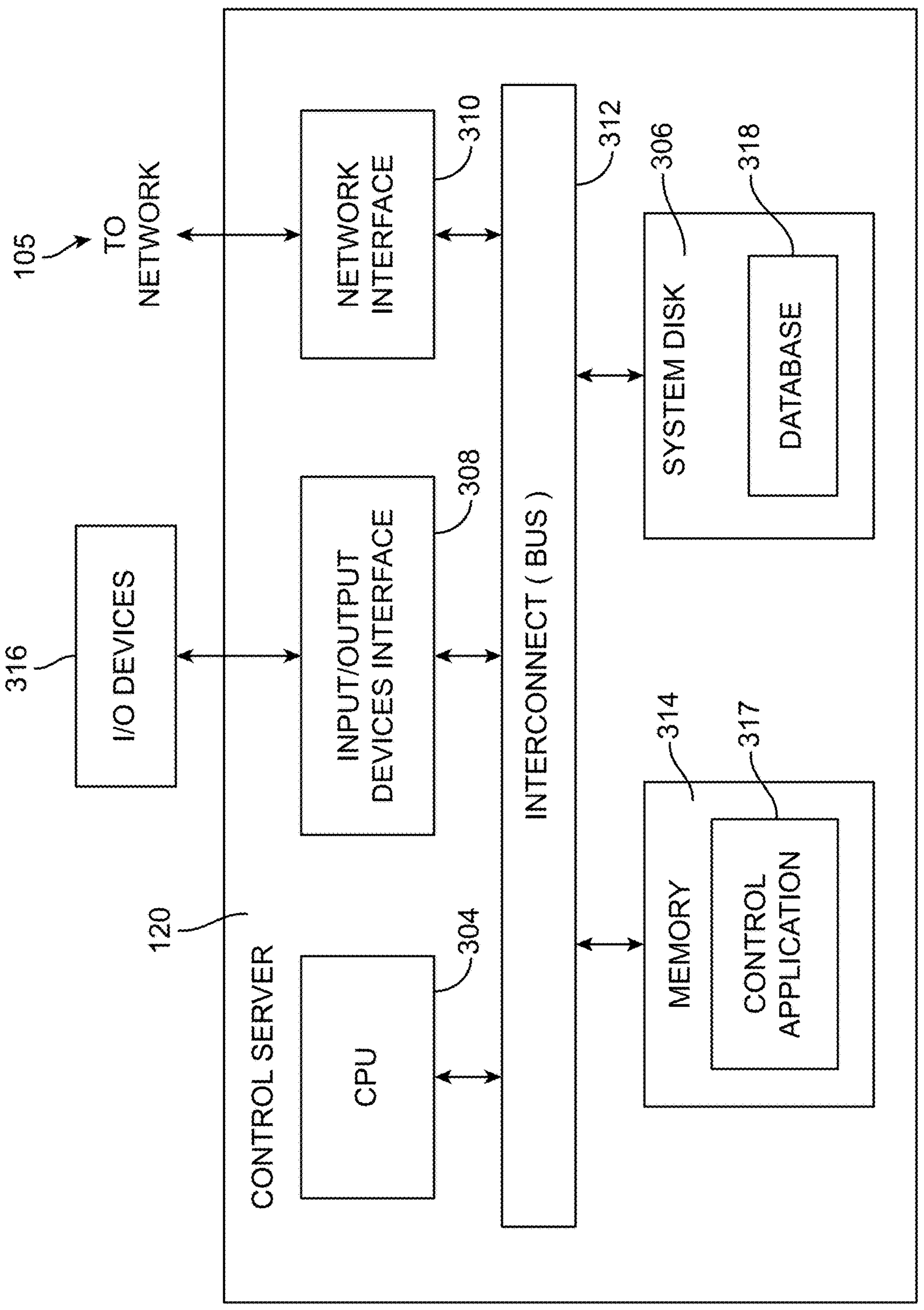
FIG. 3 is a block diagram of a control server that may be implemented in conjunction with the network infrastructure of FIG. 1, according to various embodiments.

FIG. 3 is a block diagram of a control server 120 that may be implemented in conjunction with the network infrastructure 100 of FIG. 1, according to various embodiments. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the fill source(s) 130, and the files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115.

Referring generally to FIGS. 1-3, in various embodiments, the system 100 is configured to implement an encoding pipeline to compress audiovisual data associated with media titles prior to streaming to endpoint device(s) 115. For example, and without limitation, the content server 110 of FIGS. 1-2 could implement an encoding pipeline via server application 217 that compresses files 218 prior to transmission to an endpoint device 115. Alternatively, and without limitation, files stored in fill source 130 could be compressed, via an encoding pipeline within system 100, prior to storage. As described in greater detail below in conjunction with FIGS. 5-7, the encoding pipeline can analyze audiovisual data during encoding to determine specific optimizations that can subsequently be applied, during decoding on endpoint device 115, to reduce the presence of banding artifacts.

Figure 4:
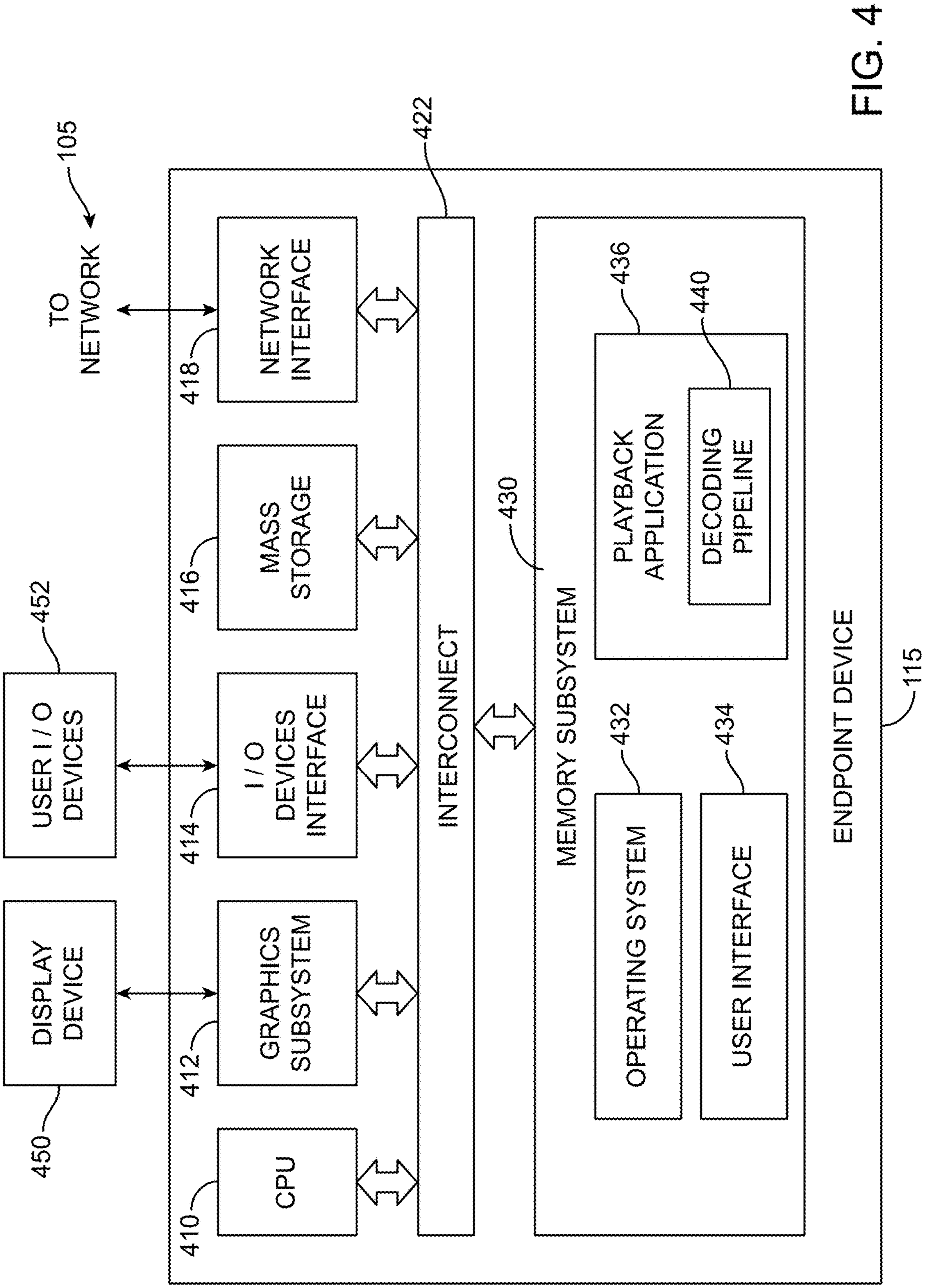
FIG. 4 is a block diagram of an endpoint device that may be implemented in conjunction with the network infrastructure of FIG. 1, according to various embodiments.

FIG. 4 is a block diagram of an endpoint device 115 that may be implemented in conjunction with the network infrastructure 100 of FIG. 1, according to various embodiments of the present invention. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one of more buttons, a keyboard, and a mouse or other pointing device. The I/O device interface 414 also includes an audio output unit configured to generate an electrical audio output signal. User I/O devices 452 includes a speaker configured to generate an acoustic output in response to the electrical audio output signal. In alternative embodiments, the display device 450 may include the speaker. A television is an example of a device known in the art that can display video frames and generate an acoustic output.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 108. Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via display device 450 and/or user I/O devices 452. In so doing, the playback application 436 includes a decoding pipeline 440 that decodes compressed content prior to display via display device. Decoding pipeline 440 is described in greater detail below in conjunction with FIG. 5.

Debanding in the Intra-Prediction Stage of a Video Coding Pipeline

Figure 5:
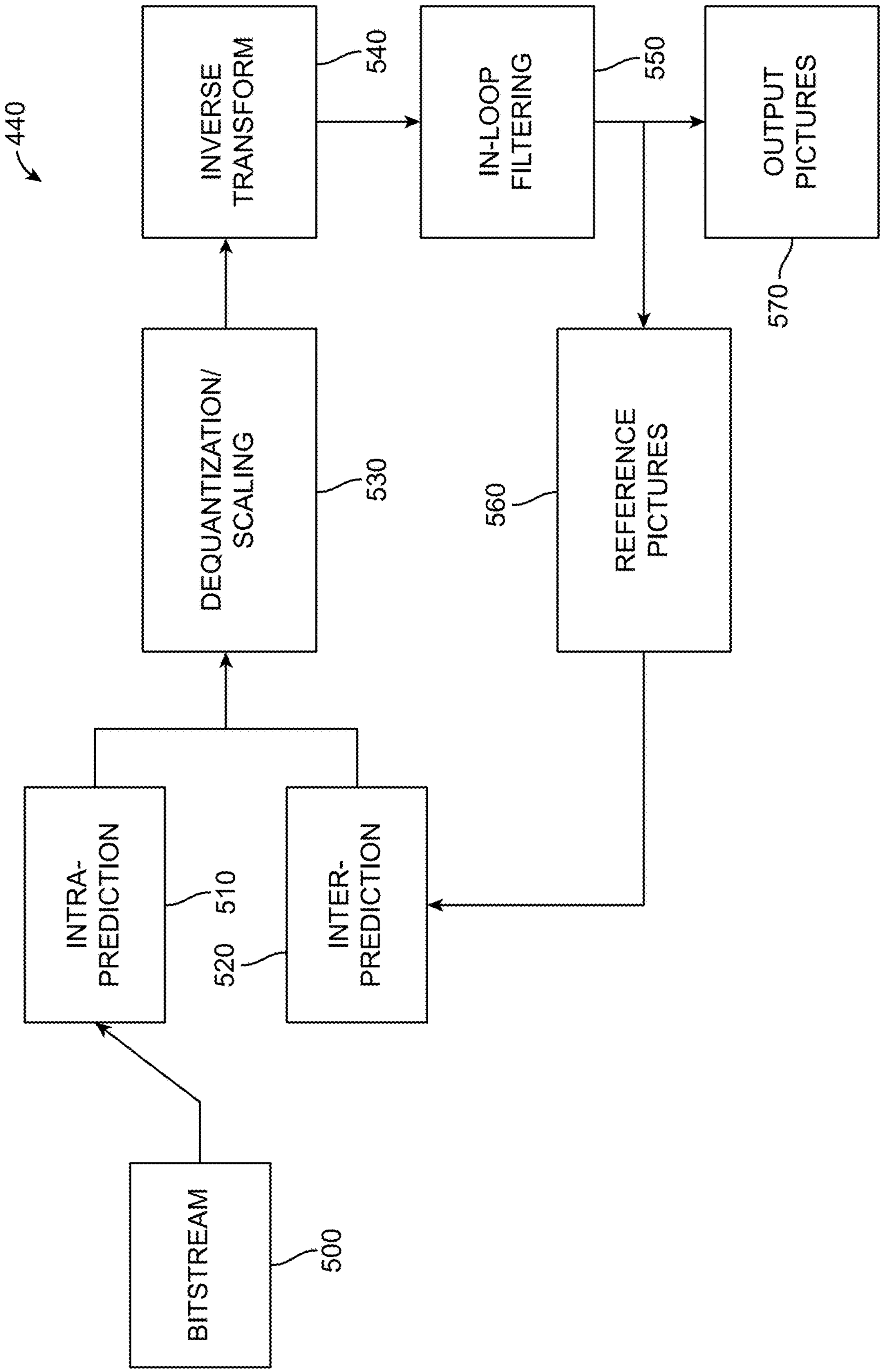
FIG. 5 is a more detailed illustration of the decoding pipeline of FIG. 4, according to various embodiments.

FIG. 5 is a more detailed illustration of the decoding pipeline of FIG. 4, according to various embodiments. As shown, decoding pipeline 440 receives bitstream 500 and generates output pictures 570. Bitstream 500 generally includes compressed frames of video data, whereas output pictures 570 includes decompressed frames of video data. Decoding pipeline 440 includes various decoding stages, including intra-prediction 510, inter-prediction 520, dequantization/descaling 530, inverse transform 540, and in-loop filtering 550.

Intra-prediction 510 is a decoding stage that generates reconstructed frames of video data using intra-prediction decoding techniques. Inter-prediction 520 is a decoding stage that can generate reconstructed frames of video data using inter-prediction decoding techniques. Dequantization/scaling 530 is a decoding stage where various quantized coefficients are scaled based on one or more quantization parameters. Inverse transform 540 is a decoding stage that converts scaled coefficients output by dequantization/scaling 530 between different domains. In-loop filtering 550 is a decoding stage that applies various filters to reconstructed frames of video data. In-loop filtering 550 generates reference pictures 560 that can be subsequently used by inter-prediction 520, as well as output pictures 570 mentioned above, which can be displayed via display device 450.

Various stages of decoding pipeline 440 can be configured to implement specific operations that can reduce the presence of banding artifacts in output pictures 570. In particular, intra-prediction 510, inverse transform 540, and in-loop transform 550 can each be configured to implement different types of filtering and/or randomized dithering operations to mitigate or at least partially prevent banding artifacts. These operations can be performed by the decoding stages mentioned above independently of one another or in any technically feasible combination with one another.

In various embodiments, during encoding of compressed frames of video data included in bitstream 500, an encoding pipeline analyzes frames of video data and determines, for a given set of frames, specific combinations and/or configurations of decoding stages that should implement the aforesaid operations during decoding to reduce banding artifacts in that set of frames. For example, and without limitation, the encoding pipeline could determine that for a given set of frames, intra-prediction 510 should filter reference samples using specific parameters, inverse transform 540 should implement randomized dithering operations, and in-loop filtering 550 should operate using an increased bit depth. The encoding pipeline may implement any technically feasible criteria to determine which configurations to apply when decoding any given set of frames. Various operations that can be implemented by intra-prediction 510 are described in greater detail below in conjunction with FIG. 6.

Figure 6:
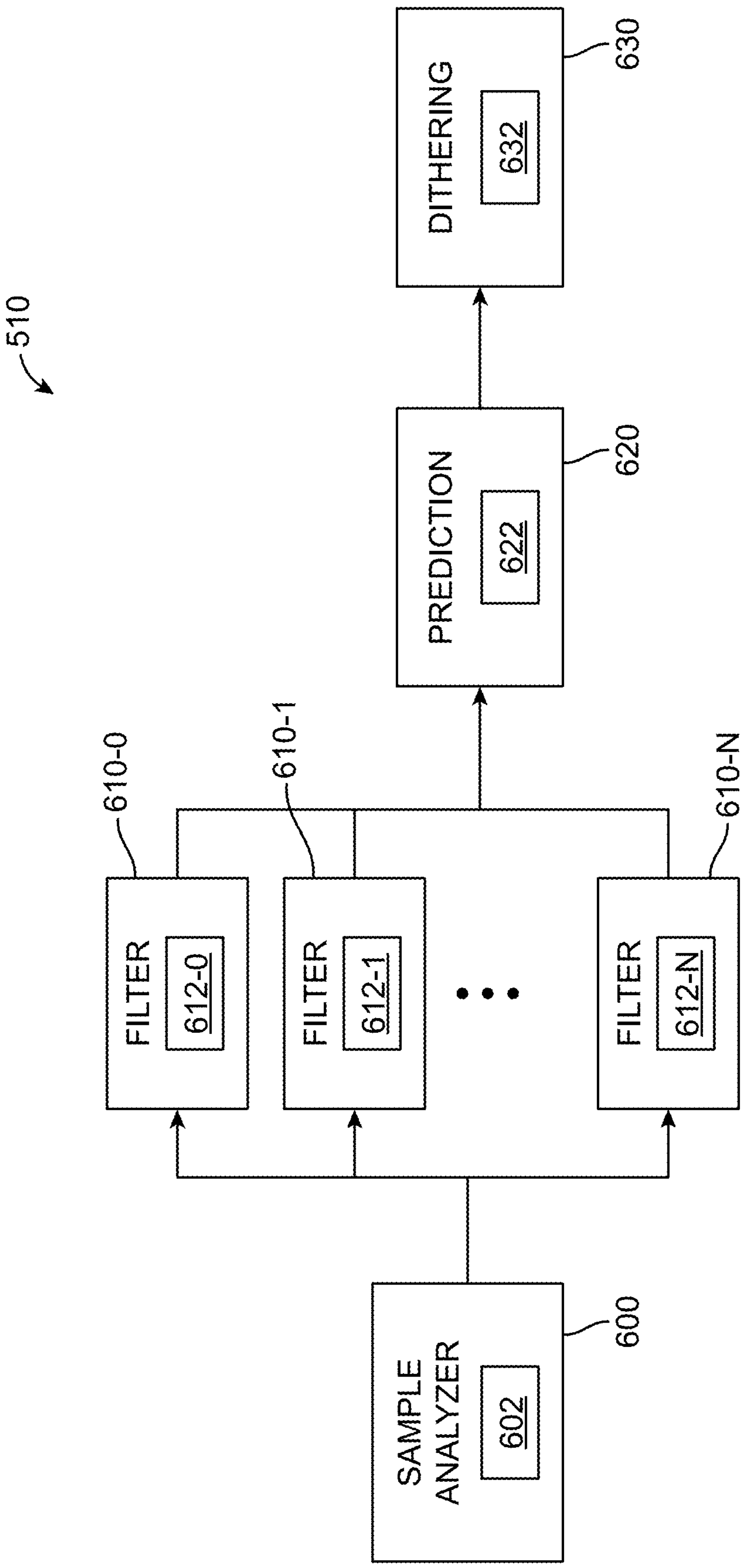
FIG. 6 is a more detailed illustration of the intra-prediction stage of FIG. 5, according to various embodiments.

FIG. 6 is a more detailed illustration of the intra-prediction stage of FIG. 5, according to various embodiments. As shown, intra-prediction 510 includes a sample analyzer 600, filters 610-0 through 610-N, prediction 620, and dithering 630. In operation, sample analyzer 600 analyzes reference samples 602 relative to various criteria and then selects between filters 610 for processing different subsets of reference samples 602. As is shown, filters 610-0 through 610-N generate filtered samples 612-0 through 612-N. In so doing, filters 610 may implement various filtering and/or padding operations, including, for example and without limitation, linear filters, adaptive filters, deblocking filters, and so forth. Prediction 620 then performs an intra-prediction operation using filtered samples 612 to generate predicted samples 622. In some instances, prediction 620 also operates on non-filtered reference samples that need not be subject to filtering. During or after prediction, dithering 630 implements a randomized dithering operation on predicted samples 622 to generate output samples 632. When dithering 630 is active, reference samples 602 are typically kept in a higher bit depth. Output samples 632 are subsequently processed by other components of decoding pipeline 440 to generate reconstructed frames of video data included in output pictures 570.

Sample analyzer 600 can implement any technically feasible criteria for selecting between filters 610. As a general matter, sample analyzer 600 identifies specific reference samples 602 that may contribute to banding artifacts, and then selects a particular filter 610 that may be suited to mitigating those banding artifacts.

In one embodiment, sample analyzer 600 may analyze the dimensions of blocks of reference samples, and then select specific filters 610 based on a metric that is derived from those dimensions. For example, and without limitation, sample analyzer 600 could determine that the sum of the block height and block width for a first block of samples falls beneath a threshold value. Sample analyzer 600 would then select filter 610-0 for processing the first block of samples. Similarly, sample analyzer 600 could determine that the sum of the block height and block width for a second block of samples exceeds the threshold value. Sample analyzer 600 would then select filter 610-1 for processing the second, larger block of samples. Sample analyzer 600 can perform such comparisons using block width, block height, or any combination thereof. An exemplary comparison that sample analyzer can use is denoted below, without limitation:

$$\begin{aligned}&\text{if } ((txwpx + txhpx >= \text{edge\_len}) \,\&\&\\&(\text{abs}(\text{above\_row}[-\text{num\_top\_pl\_m}] + \text{above\_row}[\text{num\_top\_pl} - 1] -\\&2 * \text{above\_row}[((\text{num\_top\_pl} + \text{num\_top\_pl\_m}) >> 1) - 1]) <\\&(\text{side\_thr} * (\text{num\_top\_pl} + \text{num\_top\_pl\_m}) * \text{THR\_UP} >>\\&\text{SHIFT\_THRESH})) \,\&\&\\&(\text{abs}(\text{left\_col}[-\text{num\_left\_pl\_m}] + \text{left\_col}[\text{num\_left\_pl} - 1] -\\&2 * \text{left\_col}[((\text{num\_left\_pl\_m} + \text{num\_left\_pl}) >> 1) - 1]) <\\&(\text{side\_thr} * (\text{num\_left\_p1} + \text{num\_left\_pl\_m}) * \text{THR\_UP} >>\\&\text{SHIFT\_THRESH}))\end{aligned} \tag{1}$$

In comparison (1), txwpx and txhpx are transform block dimensions, above_row is an array of above reference samples, left_col is an array of left reference samples, num_top_pl is the number of top reference samples, num_left_pl is the number of left reference samples, num_top_pl_m is the number of top samples to the left of a vertical left block boundary, num_left_pl_m is the number of samples to the top of the horizontal upper block boundary, and side_thr is a threshold that may vary with block sizes.

In another embodiment, sample analyzer 600 analyzes reference samples 602 to identify situations where specific reference samples approximate a line in one or more directions, and then selects one or more filters 610 for processing those reference samples. In so doing, sample analyzer 600 compares a given reference sample 602 to one or more adjacent reference samples to determine whether those reference samples are substantially similar, thereby indicating a linear or "flat" region. Sample analyzer 600 may perform separate comparisons to identify local flatness, depending on a prediction direction associated with intra-prediction 510. For example, and without limitation, sample analyzer 600 could perform a first comparison based on top reference samples and a second comparison based on left reference samples when prediction is performed from top to bottom and from left to right. In performing these comparisons, sample analyzer 600 may implement adaptive thresholds that are based on the number of samples and/or block dimensions. Sample analyzer 600 may further perform these comparisons based on absolute differences between sample values. For example, and without limitation, sample analyzer 600 could compare one sample value to an adjacent sample value and determine that the absolute difference in sample values falls beneath a threshold value. Any of the aforementioned comparisons can also be performed based on parameters that are set, on a per sample or per block basis, during encoding. An exemplary set of comparisons that sample analyzer 600 can implement to identify flatness is denoted below, without limitation:

$$\begin{aligned}&\text{abs}(\text{above\_row}[-\text{num\_top\_pl\_m}] + \text{above\_row}[\text{num\_top\_pl} - 1] -\\&2 * \text{above\_row}[((\text{num\_top\_pl} + \text{num\_top\_pl\_m}) >> 1) - 1] < THR1\end{aligned} \tag{2}$$

$$\begin{aligned}&(\text{abs}(\text{left\_col}[-\text{num\_left\_pl\_m}] + \text{left\_col}[\text{num\_left\_pl} - 1] -\\&2 * \text{left\_col}[((\text{num\_left\_pl\_m} + \text{num\_left\_pl}) >> 1) - 1]) < THR2\end{aligned} \tag{3}$$

$$THR1 = (\text{side\_thr} * (\text{num\_top\_pl} + \text{num\_top\_pl\_m}) * \text{THR\_UP} >> \text{SHIFT\_THRESH})) \tag{4}$$

$$THR2 = (\text{side\_thr} * (\text{num\_left\_pl} + \text{num\_left\_pl\_m}) * \text{THR\_UP} >> \text{SHIFT\_THRESH})) \tag{5}$$

In comparisons (2) and (3), the values of THR1 and THR2 can be adaptive, as shown in expressions (4) and (5). In comparisons (1) through (5), the values for side_thr, THR1 and/or THR2 may be sent in the bitstream 500. THR_UP and SHIFT_THRESH are coefficients used for representing floating values and divisions with integer values, shifts and multiplications.

In yet another embodiment, sample analyzer 600 analyzes reference samples 602 to identify block boundaries, and then selects a filter 610 that performs a deblocking operation on reference samples 602 that are adjacent to those boundaries. The block boundaries could be, for example and without limitation, boundaries between transform blocks, prediction blocks, prediction partitions, and/or coding blocks, as well as boundaries between block samples and samples added for padding purposes. An exemplary block boundary is denoted below, without limitation:

$$s[-8]s[-7]s[-6]s[-5]s[-4]s[-3]s[-2]\; s[-1] \,|\, s[0]s[1]s[2]s[3]s[4]s[5]s[6]s[7] \tag{6}$$

In (6), samples s[−8] through s[−1] reside on one side of the boundary denoted by "|", and samples s[0] through s[7] reside on the other side of the boundary.

Once sample analyzer 600 analyzes reference samples 602 and selects which filters 610 should be applied, sample analyzer 600 routes relevant subsets of reference samples 602 to the appropriately selected filters 610. A given filter 610 can implement any technically feasible filtering operation. Each filter 610 can implement a different filtering operation, or filters 610 can implement the same filter operation but with a different configuration and/or different input parameters.

In one embodiment, each filter 610 may be a linear filter that is configured with a specific filter kernel corresponding to a particular set of block dimensions. For example, and without limitation, a first filter 610 could include a first filter kernel corresponding to blocks having total block dimensions between 16 and 48, while a second filter 610 could include a second filter kernel corresponding to blocks having total block dimensions greater than or equal to 48. During analysis, sample analyzer 600 would analyze block dimensions and then route subsets of reference samples 602 to the first and second filters 610 accordingly. In this embodiment, sample analyzer 600 generally applies more low-pass filtering to larger blocks and/or flatter reference samples. An example filter is denoted below, without limitation:

```
int edge_len;
if (q_index_comp > 110)
  edge_len = EDGE_LEN;
else if (q_index_comp > 80)
  edge_len = 12;
else
  edge_len = 8;                              (7)
```

The filter denoted in (7) applies linear filtering to blocks exceeding a certain size and/or quantization parameters exceeding a certain threshold. Exemplary filter kernels that could be implemented by different filters 610 for different block sizes are denoted below, without limitation:

$$\text{kernel}[11] = \{1, 1, 2, 2, 2, 2, 2, 2, 2, 1, 1\} \tag{8}$$

$$kernel[17] = \{1, 1, 1, 1, 1, 1, 1, 1, 0, 1, 1, 1, 1, 1, 1, 1, 1\} \tag{9}$$

In a further embodiment, each filter 610 further implements adaptive filtering via a constraint function that constrains filter coefficients. The constraint function may weight reference samples relative to a central reference sample. As above, different filter kernels may be applied to different reference samples 602 having different dimensions. Strength and damping values for the constraint function may also vary based on various parameters, including quantization parameters or sample block dimensions, for example and without limitation. An exemplary constraint and corresponding constraint function are denoted below, without limitation:

```
s += kernel[j] * constraint(edge[k] − s0, strength, damping)        (10)
int constraint(int diff, int threshold, int damping) {
  if (!threshold) return 0;
  const int shift = MAX(0, damping − get_msb(threshold));
return sign(diff) * MIN(abs(diff), MAX(0, threshold −
(abs(diff) >> shift)));
}                                                                    (11)
```

In various embodiments, filters 610 may also implement padding operations under different circumstances. In particular, filters 610 may apply padding when reference samples 602 reside close to block boundaries. In some configurations, filters 610 may replicate previous sample values. In other configurations, filters 610 may reflect sample values across block boundaries. Filters 610 are generally configured to compute padded sample values based on any technically feasible combination of values derived from reference samples 602. An exemplary expression for computing padding values is denoted below, without limitation:

```
for (int i = 0; i < INTRA_SMOOTH_PAD; ++i)
  edge[sz + INTRA_SMOOTH_PAD + i] =
    clip_pixel_highbd((edge[sz +
INTRA_SMOOTH_PAD − 1] << 1) − edge[sz +
INTRA_SMOOTH_PAD − 2 − i],
bd)(12)
```

The approach denoted in expression (12) may preserve a gradient that is present in source data. Clipping may be applied to keep sample values within a given range. In directional intra-prediction, filters 610 may also implement specialized padding to promote a smooth transition between adjacent samples. For example, and without limitation, when prediction is performed from top to bottom and from left to right, filters 610 could filter top samples using left adjacent samples for padding, and filter left adjacent samples using top samples for padding. An exemplary expression for computing sample values in this manner is denoted below, without limitation:

```
memcpy(&edge[INTRA_SMOOTH_PAD], p, sz * sizeof(*p));
for (int i = 0; i < INTRA_SMOOTH_PAD; ++i)
edge[INTRA_SMOOTH_PAD − 1 − i] = q[i];                        (13)
```

In expression (13), samples p and q are left and top samples or top and left samples respectively.

In some embodiments, filters 610 may perform deblocking operations on reference samples 602 that are identified by sample analyzer 600 as residing along a block boundary. These deblocking operations may be performed in conjunction with any of the other types of filtering discussed thus far. A given filter 610 configured to perform deblocking can be configured to perform a symmetric deblocking operation using equal numbers of samples on either side of a block boundary, or an asymmetric deblocking operation using different numbers of samples on either side of the block boundary. Deblocking reference samples 602 in the manner described can be implemented with directional prediction techniques or other intra-prediction modes of operation.

In one embodiment, sample analyzer 600 may implement multiple deblocking filters configured with different parameters for filtering different subsets of reference samples 602. For example, and without limitation, filter 610-0 could implement a deblocking operation using a first number of reference samples residing adjacent to a block boundary, and filter 610-1 could implement a deblocking operation using a second, larger number of reference samples residing adjacent to a block boundary. Sample analyzer 600 would route different subsets of reference samples to these different deblocking filters based on various block attributes, such as block dimensions, for example and without limitation. An exemplary set of expressions for performing deblocking operations is denoted below:

$$d = (3*(s[0]_j - s[-1]_j) - (s[1]_j - s[-2]_j)/2 \tag{14}$$

$$d' = \text{clamp}(d, -thr5, thr5) \tag{15}$$

-continued $$s'[i]_i = s[i]_j - d*(N-i)/(M+N+1), \text{ for } i = 0, \ldots, N-1 \quad (16)$$

$$s'[-i-1]_j = s[-i-1]_j + d*(M-i)/(M+N+1), \quad (17)$$
$$\text{for } i = 0, \ldots, M-1$$

In expressions (14) through (17), M and N are the number of samples modified on the left and right side of the block boundary, respectively. Further, s and s' are sample values before and after deblocking, respectively.

With the techniques described thus far, sample analyzer 600 and filters 610 operate in conjunction with one another to analyze reference samples 602 and then apply relevant filtering operations that may reduce banding artifacts. Persons skilled in the art will understand that the various selection criteria implemented by sample analyzer 600 can be used in conjunction with any of the filtering techniques implemented by filters 610 in any technically feasible fashion. Any of the various embodiments described thus far can further be used in conjunction with one another. For example, and without limitation, sample analyzer 600 could identify blocks of reference samples 602 having total dimensions that exceed a threshold value and could then determine that a specific filter 610 having a particular filter kernel should be applied to those reference samples. In conjunction with this processing, sample analyzer 600 could also determine that some of those same reference samples 602 also reside adjacent to a block boundary and should therefore also be processed using a filter 610 configured to perform deblocking operations.

When filtering of reference samples 602 is complete, prediction 620 performs an intra-prediction process to generate predicted samples 622. Prediction 620 may implement any variety of directional or non-directional intra-prediction. Based on predicted samples 622, dithering 630 then implements a randomized dithering operation to generate output samples 632. In one embodiment, dithering 630 is performed on a given predicted sample 622 during normalization by adding a randomized value to the predicted sample value and then implementing a bit-shift operation to round the incremented predicted sample value to a lower bit depth. The randomized value can be a random value or a pseudo-random value. A random value used during this process can be generated using any technically feasible random number generator. A pseudo-random value used during this process can be generated by indexing an array of random values using coordinates of the given predicted sample 622, among other possibilities. In either case, the randomized value is drawn from a range of possible values. Dithering 630 may implement a larger range of possible values in order to apply more dithering to predicted samples 622 or implement a smaller range of possible values to apply less dithering to predicted samples 622. The randomized dithering approach described herein advantageously reduces banding artifacts by preventing the formation of well-defined and abrupt gradients between color values. Exemplary dithering operations are denoted below, without limitation:

$$x'_{ij} = (x_{sum,ij} + rand(i, j)) >> 16 \quad (18)$$

$$x'_{ij} = (x_{sum,ij} + rand(i, j)) >> 4 \quad (19)$$

In operations (18) and (19), i and j are vertical and horizontal sample coordinates that may be either global or local coordinates. An exemplary randomization function and corresponding pseudo-random array are denoted below, without limitation:

$$rand(i, j) = \text{ra\_num}[(j*mcol + i*mrow)\ \&\ 31] \quad (20)$$

$$\text{intra\_num\_part}[32] = \{12, 0, 6, 4, 15, 12, 6, 11, 11, 9, 15, \quad (21)$$
$$12, 9, 1, 14, 4, 7, 5, 12, 13, 13, 14, 1, 11, 8, 5, 9, 6, 3, 4, 2, 2\}$$

In various embodiments, inverse transform 540 and/or in-loop filtering 550 within decoding pipeline 440 of FIG. 5 may implement randomized dithering operations such as those described above. Referring generally to FIGS. 4-6, decoding pipeline 440 and the various components described can implement any combination of the disclosed techniques independently or in conjunction with one another in order to reduce banding artifacts. Further, persons skilled in the art will understand how the techniques described herein relative to decoding pipeline 440 can also be implemented within analogous stages of a corresponding encoding pipeline. For example, and without limitation, the various operations described above with regard to intra-prediction 510 could also be implemented within an intra-prediction stage of an encoding pipeline.

Figure 7:
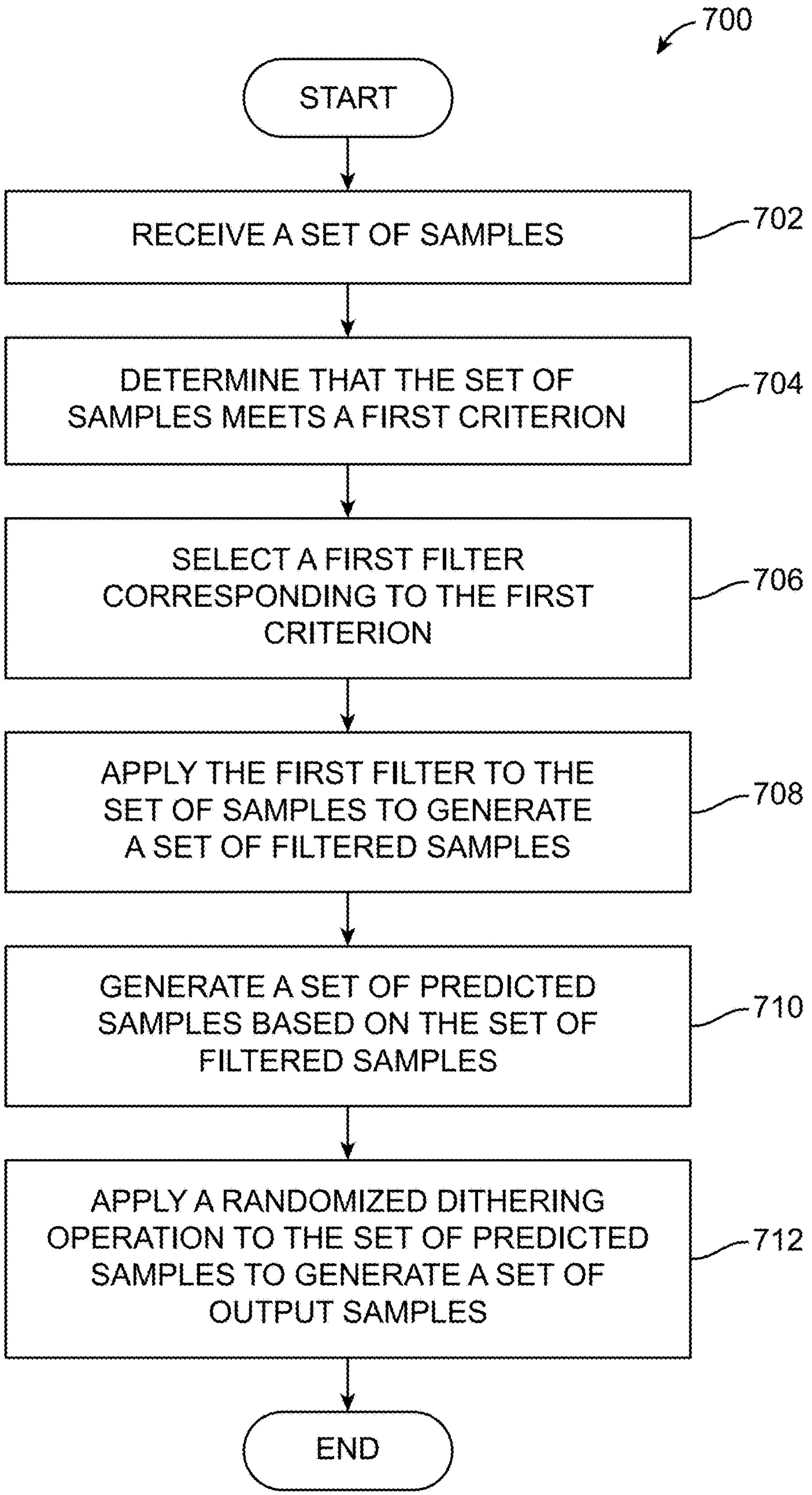
FIG. 7 is a flow diagram of method steps for filtering reference samples during intra-prediction coding, according to various embodiments.

FIG. 7 is a flow diagram of method steps for filtering reference samples during intra-prediction decoding, according to various embodiments. Although the method steps are described in conjunction with the systems of FIGS. 1-6, persons skilled in the art will understand that any system configured to perform the method steps, in any order, is within the scope of the present invention.

As shown, a method 700 begins at step 702, where sample analyzer 600 of FIG. 6 receives a set of samples, such as reference samples 602. The set of samples are grouped into blocks having different possible sizes and dimensions. The set of samples are initially received by endpoint device 115 via a compressed bitstream that includes frames of compressed video data. The frames of compressed video data may correspond to a media title provided by content server 110 of FIG. 1. In one embodiment, the set of samples is upscaled to a higher bit depth by sample analyzer 600 or upscaled to a higher bit depth prior to being received by sample analyzer 600.

At step 704, sample analyzer 600 determines that the set of samples meets a first criterion. The first criterion may relate to any possible attribute of the set of samples. In one embodiment, sample analyzer 600 may determine that the first criterion is met when a metric derived from the dimensions of a block that includes the set of samples exceeds a given threshold. Sample analyzer 600 could generate the metric using any technically feasible approach. For example, and without limitation, sample analyzer 600 could compute the product of the length and width of the block that includes the set of samples. In another embodiment, sample analyzer 600 determines that the first criterion is met when at least a portion of the set of samples resides along a block boundary.

At step 706, sample analyzer 600 selects a first filter corresponding to the first criteria. The first filter can be any technically feasible type of filter configured to process reference samples. In one embodiment, the first filter is a linear filter that implements a filter kernel corresponding to the first criteria. For example, the first filter could implement a wide filter kernel corresponding to blocks that meet a specific size criterion. In another embodiment, the first filter is a deblocking filter that performs a deblocking operation along block boundaries.

At step 708, sample analyzer 600 applies the first filter to the set of samples to generate a set of filtered samples. The first filter could be, for example and without limitation, any of filters 610 shown in FIG. 6. During filtering, the first filter may also perform a padding operation close to block boundaries. In so doing, the first filter may replicate filtered sample values or reflect filtered sample values across block boundaries. In various embodiments, the first filter generates sample values for padding purposes for a given location using any technically feasible combination of adjacent sample values.

At step 710, prediction 620 generates a set of predicted samples based on the set of filtered samples generated at step 708. Prediction 620 performs a directional or non-directional intra-prediction computation. Because the set of samples is subject to the first filter prior to the prediction operation, banding artifacts can be reduced in the set of predicted samples. In practice, prediction 620 may also perform step 710 based on a remaining set of non-filtered samples not subjected to the filtering operations performed at step 708 and, instead, derived directly from the set of samples.

At step 712, dithering 630 applies a randomized dithering operation to the set of predicted samples to generate a set of output samples. In one embodiment, dithering is performed on a given predicted sample during normalization by adding a randomized value to the predicted sample value and then implementing a bit-shift operation to round the predicted sample value to a lower bit depth. The randomized value can be a random value or a pseudo-random value. A random value used during this process can be generated using any technically feasible random number generator. A pseudo-random value used during this process can be generated by indexing an array of random values using coordinates of the given predicted sample. Applying dithering using the randomized technique described can mitigate the formation of abrupt gradients that contribute to banding artifacts. In one embodiment, dithering 630 is applied during prediction 620.

In sum, a decoding pipeline is configured to perform an intra-prediction decoding stage based on reference samples received via a compressed bitstream. The intra-prediction decoding stage includes a sample analyzer that is configured to analyze reference samples before intra-prediction occurs. The sample analyzer evaluates the reference samples using a set of criteria to identify a subset of reference samples that may contribute to the appearance of banding artifacts. The sample analyzer then selects a set of filters corresponding to the set of criteria and filters the subset of reference samples. The intra-prediction decoding stage then implements an intra-prediction operation using the filtered subset of reference samples and, in some cases, a remaining subset of non-filtered reference samples, to generate a set of predicted samples. The decoding pipeline can further be configured to perform a randomized dithering operation with the set of predicted samples. During randomized dithering, a random or pseudo-random value is added to a predicted sample value prior to rounding, thereby mitigating situations where adjacent but differing sample values are rounded to the same value.

At least one technical advantage of the disclosed techniques relative to the prior art is that the disclosed techniques enable the decoding pipeline to reduce the appearance of banding artifacts in reconstructed frames of video data, thereby resulting in greater overall visual quality and higher-quality viewing experiences when streaming media titles. Another technical advantage of the disclosed techniques is that filtering reference samples during intra-prediction does not require the addition of any post-processing operations to the decoding pipeline. Accordingly, the disclosed techniques can be implemented without introducing significant delays during playback of a media title. Yet another technical advantage of the disclosed techniques is that the disclosed decoding pipeline can be deployed to different types of endpoint devices, which can lead to more consistent debanding performance and visual quality across different endpoint devices having different hardware and/or software configurations. These technical advantages provide one or more technological improvements over prior art approaches.

1. Some embodiments include a computer-implemented method for reducing banding artifacts in decoded video data, the method comprising receiving a first set of reference samples, determining that the first set of reference samples meets a first criterion, selecting a first filter corresponding to the first criterion, wherein the first filter comprises a linear filter that implements a first filter kernel corresponding to the first criterion, applying the first filter to the first set of reference samples to generate a first set of filtered samples, performing at least one intra-prediction decoding operation on the first set of filtered samples to generate a first set of predicted samples, and generating a first portion of reconstructed video data based on the first set of predicted samples.
2. The computer-implemented method of clause 1, wherein determining that the first set of reference samples meets the first criterion comprises generating a metric based on a set of dimensions associated with a sample block that includes the first set of reference samples, and determining that the metric is greater than a threshold value.
3. The computer-implemented method of any of clauses 1-2, wherein determining that the first set of reference samples meets the first criterion comprises computing an absolute difference value based on a first sample value associated with a first sample included in the first set of reference samples and a second sample value associated with a second sample included in the first set of reference samples, and determining that the absolute difference value is less than a threshold value.
4. The computer-implemented method of any of clauses 1-3, wherein determining that the first set of reference samples meets the first criterion comprises determining that at least a subset of reference samples included in the first set of reference samples resides adjacent to a block boundary associated with a sample block that includes the first set of reference samples.
5. The computer-implemented method of any of clauses 1-4, wherein the first filter comprises a low-pass filter.
6. The computer-implemented method of any of clauses 1-5, wherein the first filter comprises an adaptive filter that implements a first constraint function corresponding to the first criterion.
7. The computer-implemented method of any of clauses 1-6, wherein the first filter comprises a deblocking filter that implements a first set of parameters corresponding to the first criterion.
8. The computer-implemented method of any of clauses 1-7, wherein the first filter, during operation, generates a first padding value by replicating a first sample in the first set of reference samples.

9. The computer-implemented method of any of clauses 1-8, wherein the first filter, during operation, generates a first padding value by mirroring a first sample included in the first set of reference samples across a block boundary associated with a sample block that includes the first set of reference samples.
10. The computer-implemented method of any of clauses 1-9, wherein the first filter, during operation, generates a first padding value based on at least two reference samples included in the first set of reference samples.
11. In various embodiments, one or more non-transitory computer-readable media include instructions that, when executed by one or more processors, cause the one or more processors to reduce banding artifacts in decoded video data by performing the steps of receiving a first set of reference samples via a compressed bitstream, determining that the first set of reference samples meets a first criterion, selecting a first filter corresponding to the first criterion, applying the first filter to the first set of reference samples to generate a first set of filtered samples, performing at least one intra-prediction decoding operation on the first set of filtered samples to generate a first set of predicted samples, and generating a first portion of decoded video data based on the first set of predicted samples.
12. The one or more non-transitory computer-readable media of clause 11, wherein the step of determining that the first set of reference samples meets the first criterion comprises combining a first dimension associated with a sample block that includes the first set of reference samples with a second dimension associated with the sample block to generate a metric, and determining that the metric is greater than a threshold value.
13. The one or more non-transitory computer-readable media of any of clauses 11-12, wherein the step of determining that the first set of reference samples meets the first criterion comprises computing an absolute difference value based on a first sample value associated with a first sample included in the first set of reference samples and a second sample value associated with a second sample included in the first set of reference samples, and determining that the absolute difference value is less than a threshold value.
14. The one or more non-transitory computer-readable media of any of clauses 11-13, wherein the step of determining that the first set of reference samples meets the first criterion comprises determining that at least a subset of reference samples included in the first set of reference samples resides adjacent to a block boundary associated with a sample block that includes the first set of reference samples.
15. The one or more non-transitory computer-readable media of any of clauses 11-14, wherein the first filter comprises a linear filter that implements a first filter kernel corresponding to the first criterion.
16. The one or more non-transitory computer-readable media of any of clauses 11-15, wherein the first filter comprises an adaptive filter that implements a first constraint function corresponding to the first criterion.
17. The one or more non-transitory computer-readable media of any of clauses 11-16, wherein the first filter comprises a deblocking filter that implements a first set of parameters corresponding to the first criterion.
18. The one or more non-transitory computer-readable media of any of clauses 11-17, further comprising the step of performing a randomized dithering operation on a first predicted sample value associated with a first predicted sample included in the first set of predicted samples by adding a randomized value to the first predicted sample value to generate a first randomized sample value, and generating a first output sample value by performing a rounding operation with the first randomized sample value.
19. The one or more non-transitory computer-readable media of any of clauses 11-18, further comprising the steps of receiving a second set of reference samples via the compressed bitstream, determining that the second set of reference samples meets a second criterion, selecting a second filter corresponding to the second criterion, applying the second filter to the second set of reference samples to generate a second set of filtered samples, performing the at least one intra-prediction decoding operation on the second set of filtered samples to generate a second set of predicted samples, and generating a second portion of decoded video data based on the second set of predicted samples.
20. Some embodiments include a system comprising one or more memories storing instructions, and one or more processors coupled to the one or more memories that, when executing the instructions, perform the steps of receiving a first set of reference samples via a compressed bitstream, determining that the first set of reference samples meets a first criterion, selecting a first filter corresponding to the first criterion, applying the first filter to the first set of reference samples to generate a first set of filtered samples, performing at least one intra-prediction decoding operation on the first set of filtered samples to generate a first set of predicted samples, and generating a first portion of decoded video data based on the first set of predicted samples.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for reducing banding artifacts in decoded video data, the method comprising:
- receiving a first set of reference samples via a compressed bitstream;
- determining that the first set of reference samples meets a first criterion;
- selecting a first filter corresponding to the first criterion, wherein the first filter is selected from a plurality of filters based on the first criterion met by the first set of reference samples received via the compressed bitstream, wherein the plurality of filters perform a plurality of different types of functions that includes a linear function, a constraint function, and a deblocking function;
- applying the first filter to the first set of reference samples to generate a first set of filtered samples;
- performing at least one intra-prediction decoding operation on the first set of filtered samples to generate a first set of predicted samples; and
- generating a first portion of reconstructed video data based on the first set of predicted samples.

2. The computer-implemented method of claim 1, wherein determining that the first set of reference samples meets the first criterion comprises:
- generating a metric based on a set of dimensions associated with a sample block that includes the first set of reference samples; and
- determining that the metric is greater than a threshold value.

3. The computer-implemented method of claim 1, wherein determining that the first set of reference samples meets the first criterion comprises:
- computing an absolute difference value based on a first sample value associated with a first sample included in the first set of reference samples and a second sample value associated with a second sample included in the first set of reference samples; and
- determining that the absolute difference value is less than a threshold value.

4. The computer-implemented method of claim 1, wherein determining that the first set of reference samples meets the first criterion comprises determining that at least a subset of reference samples included in the first set of reference samples resides adjacent to a block boundary associated with a sample block that includes the first set of reference samples.

5. The computer-implemented method of claim 1, wherein the first filter comprises a low-pass filter.

6. The computer-implemented method of claim 1, wherein the first filter comprises an adaptive filter that implements a first constraint function corresponding to the first criterion.

7. The computer-implemented method of claim 1, wherein the first filter comprises a deblocking filter that implements a first set of parameters corresponding to the first criterion.

8. The computer-implemented method of claim 1, wherein the first filter, during operation, generates a first padding value by replicating a first sample in the first set of reference samples.

9. The computer-implemented method of claim 1, wherein the first filter, during operation, generates a first padding value by mirroring a first sample included in the first set of reference samples across a block boundary associated with a sample block that includes the first set of reference samples.

10. The computer-implemented method of claim 1, wherein the first filter, during operation, generates a first padding value based on at least two reference samples included in the first set of reference samples.

11. One or more non-transitory computer-readable media including instructions that, when executed by one or more processors, cause the one or more processors to reduce banding artifacts in decoded video data by performing the steps of:

receiving a first set of reference samples via a compressed bitstream;

determining that the first set of reference samples meets a first criterion;

selecting a first filter corresponding to the first criterion, wherein the first filter is selected from a plurality of filters based on the first criterion met by the first set of reference samples received via the compressed bitstream, wherein the plurality of filters perform a plurality of different types of functions that includes a linear function, a constraint function, and a deblocking function;

applying the first filter to the first set of reference samples to generate a first set of filtered samples;

performing at least one intra-prediction decoding operation on the first set of filtered samples to generate a first set of predicted samples; and generating a first portion of decoded video data based on the first set of predicted samples.

12. The one or more non-transitory computer-readable media of claim 11, wherein the step of determining that the first set of reference samples meets the first criterion comprises:

combining a first dimension associated with a sample block that includes the first set of reference samples with a second dimension associated with the sample block to generate a metric; and determining that the metric is greater than a threshold value.

13. The one or more non-transitory computer-readable media of claim 11, wherein the step of determining that the first set of reference samples meets the first criterion comprises:

computing an absolute difference value based on a first sample value associated with a first sample included in the first set of reference samples and a second sample value associated with a second sample included in the first set of reference samples; and determining that the absolute difference value is less than a threshold value.

14. The one or more non-transitory computer-readable media of claim 11, wherein the step of determining that the first set of reference samples meets the first criterion comprises determining that at least a subset of reference samples included in the first set of reference samples resides adjacent to a block boundary associated with a sample block that includes the first set of reference samples.

15. The one or more non-transitory computer-readable media of claim 11, wherein the first filter comprises a linear filter that implements a first filter kernel corresponding to the first criterion.

16. The one or more non-transitory computer-readable media of claim 11, wherein the first filter comprises an adaptive filter that implements a first constraint function corresponding to the first criterion.

17. The one or more non-transitory computer-readable media of claim 11, wherein the first filter comprises a deblocking filter that implements a first set of parameters corresponding to the first criterion.

18. The one or more non-transitory computer-readable media of claim 11, further comprising the step of performing a randomized dithering operation on a first predicted sample value associated with a first predicted sample included in the first set of predicted samples by:

adding a randomized value to the first predicted sample value to generate a first randomized sample value; and generating a first output sample value by performing a rounding operation with the first randomized sample value.

19. The one or more non-transitory computer-readable media of claim 11, further comprising the steps of:

receiving a second set of reference samples via the compressed bitstream;

determining that the second set of reference samples meets a second criterion;

selecting a second filter corresponding to the second criterion;

applying the second filter to the second set of reference samples to generate a second set of filtered samples;

performing the at least one intra-prediction decoding operation on the second set of filtered samples to generate a second set of predicted samples; and generating a second portion of decoded video data based on the second set of predicted samples.

20. A system comprising:

one or more memories storing instructions; and one or more processors coupled to the one or more memories that, when executing the instructions, perform the steps of:

receiving a first set of reference samples via a compressed bitstream, determining that the first set of reference samples meets a first criterion, selecting a first filter corresponding to the first criterion, wherein the first filter is selected from a plurality of filters based on the first criterion met by the first set of reference samples received via the compressed bitstream, wherein the plurality of filters perform a plurality of different types of functions that includes a linear function, a constraint function, and a deblocking function, applying the first filter to the first set of reference samples to generate a first set of filtered samples, performing at least one intra-prediction decoding operation on the first set of filtered samples to generate a first set of predicted samples, and generating a first portion of decoded video data based on the first set of predicted samples.

* * * * *